(12) United States Patent
Wo et al.

(10) Patent No.: US 7,961,407 B2
(45) Date of Patent: Jun. 14, 2011

(54) TECHNIQUES FOR STEERING AN OPTICAL BEAM

(75) Inventors: Yei Wo, East Brunswick, NJ (US); Stephen A. DeChiaro, Freehold, NJ (US)

(73) Assignee: D & S Consultants, Inc., Eatontown, NJ (US)

( * ) Notice: Subject to any disclaimer, the term of this patent is extended or adjusted under 35 U.S.C. 154(b) by 142 days.

(21) Appl. No.: 12/135,963

(22) Filed: Jun. 9, 2008

(65) Prior Publication Data
US 2009/0273850 A1  Nov. 5, 2009

Related U.S. Application Data

(63) Continuation of application No. 11/392,854, filed on Mar. 29, 2006, now Pat. No. 7,385,768.

(60) Provisional application No. 60/738,771, filed on Nov. 22, 2005.

(51) Int. Cl.
*G02B 17/00* (2006.01)

(52) U.S. Cl. ......... 359/727; 359/728; 359/730; 359/900

(58) Field of Classification Search .................. 359/727, 359/726, 728–733, 900
See application file for complete search history.

(56) References Cited

U.S. PATENT DOCUMENTS

| | | | |
|---|---|---|---|
| 5,396,302 A | 3/1995 | Triller | |
| 5,633,695 A * | 5/1997 | Feke et al. | 351/221 |
| 5,815,519 A | 9/1998 | Aoshima et al. | |
| 6,099,127 A | 8/2000 | Manivannan et al. | |
| 6,198,563 B1 | 3/2001 | Atsuumi | |
| 6,621,581 B1 | 9/2003 | Hunt et al. | |
| 7,184,665 B2 | 2/2007 | Morozov et al. | |
| 7,253,970 B2 * | 8/2007 | Scheiner et al. | 359/727 |
| 7,505,133 B1 | 3/2009 | Zawaideh et al. | |
| 2005/0243875 A1 | 11/2005 | Le et al. | |
| 2007/0063134 A1 | 3/2007 | Wine et al. | |
| 2007/0109451 A1 | 5/2007 | Pease et al. | |

* cited by examiner

*Primary Examiner* — Jack Dinh (74) *Attorney, Agent, or Firm* — Fox Rothschild, LLP; Dennis M. Carleton (57) ABSTRACT

Reflectors having concave reflecting surfaces (e.g., parabolic reflectors) and electronically controlled beam steering elements are used for rapid, low-diversion, wide-angle, and precision steering of optical beams, including laser beams.

18 Claims, 15 Drawing Sheets

TECHNIQUES FOR STEERING AN OPTICAL BEAM

CROSS REFERENCE TO RELATED APPLICATIONS

This application is related to and claims benefit from pending non-provisional U.S. patent application Ser. No. 11/392,854, filed Mar. 29, 2006, which is herein incorporated by reference, and which was related to and claims the benefit of provisional Patent Application Ser. No. 60/738,771, filed Nov. 22, 2005 (the priority date hereof).

FIELD OF THE INVENTION

The present invention relates to techniques for steering optical beams and, in particular, laser beams.

BACKGROUND OF THE INVENTION

Precise and controllable delivery of laser beams to a desired location is required in many communications, industrial, and military applications. Presently, laser beam steering systems typically include electro-mechanical systems having massive mirrors, pointing gimbals, turrets, and the like beam steering components. Such systems generally provide relatively slow and imprecise beam movements.

SUMMARY OF THE INVENTION

Techniques for steering optical beams are disclosed. Embodiments of the invention utilize electronically controlled beam steering elements and reflectors having concave reflecting surfaces (e.g., parabolic reflectors) to achieve rapid, low-diversion, wide-angle, and precision steering of optical beams, including laser beams.

All objects, features and advantages of the present invention will become apparent in the following detailed written description.

The Summary is neither intended nor should it be construed as being representative of the full extent and scope of the present invention, which these and additional aspects will become more readily apparent from the detailed description, particularly when taken together with the appended drawings.

The images in the drawings are simplified for illustrative purposes and are not depicted to scale. To facilitate understanding, identical reference numerals are used, where possible, to designate substantially identical elements that are common to the figures, except that suffixes may be added, when appropriate, to differentiate such elements.

It has been contemplated that features or steps of one embodiment may be incorporated in other embodiments of the invention without further recitation.

DETAILED DESCRIPTION

The present invention relates to techniques for steering optical beams and, in particular, for rapid, low-diversion, wide-angle, and precision steering of laser beams, among other optical beams. Herein, the terms "reflector" and "reflecting surface" and the terms "ray," "beam," "optical beam," and "laser beam" are used interchangeably. The term "light" is broadly used in reference to visible and invisible electro-magnetic radiation.

Parabolic reflectors of light (i.e., reflectors having concave parabolic reflecting surfaces) are used in the discussed below preferred embodiments of inventive beam steering apparatuses. However, in alternate embodiments of such apparatuses, the parabolic reflectors or at least a portion thereof may be substituted by reflectors having other types of concave reflecting surfaces, including spherical, aspherical, cylindrical, ellipsoidal, or hyperboloidal reflecting surfaces.

Figure 1:
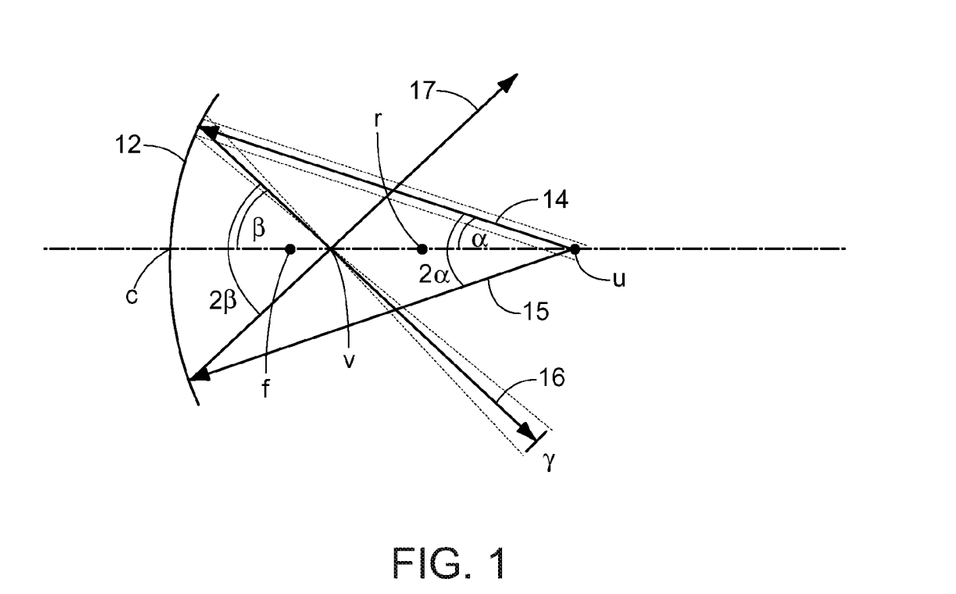
FIG. 1 is a schematic diagram illustrating ray paths for paraxial rays in a parabolic reflector.

FIG. 1 is a schematic diagram illustrating ray paths for paraxial rays in a parabolic reflector. A narrow beam of light from a reasonably collimated light source is directed towards a parabolic reflector 12 via a point u. Conventionally, only beams 14, 15 representing the extremes of a beam steering range in one particular plane are shown. At one extreme of the beam steering range, a beam 14 passes through the point u at an angle $\alpha$ to an optical axis c-u of the parabolic reflector 12. The beam 14 is reflected from the parabolic reflector 12 as a beam 16 passing through a point v on the optical axis c-u at an angle $\beta$ to the optical axis. Distances c-v and c-u may be calculated from focusing properties of the parabolic reflector 12 using an equation $1/v+1/u=1/f=2/r$, where f is a focal length and r is a radius of curvature of the parabolic reflector 12, respectively. At other extreme of the beam steering range, a beam 15 passing through the point u is then reflected from the parabolic reflector 12 as a beam 17, which passes through the point v at an angle $\beta$ to the optical axis c-u. As such, the parabolic reflector 12 amplifies a steering range of a beam passing through the point u from $2\alpha$ to $2\beta$. However, in this configuration, the parabolic reflector 12 produces diverging output beams (a divergence angle $\gamma$ of the beam 16 is shown).

Figure 1A:
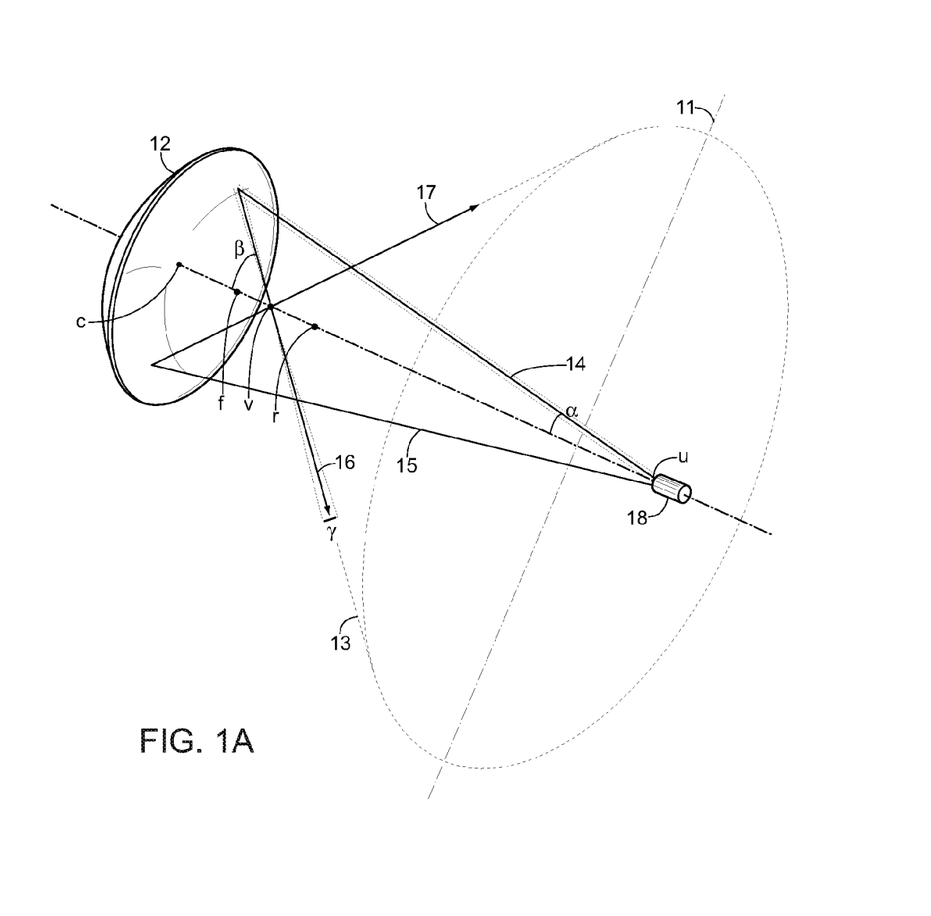
FIG. 1A is a schematic perspective view of a beam steering device having the parabolic reflector of FIG. 1.

FIG. 1A is a schematic perspective view of a beam steering device having the parabolic reflector 12 of FIG. 1. A three-dimensional cone 13 emanating from the point v represents a field of regard for optical beams, which are originated by a reasonably collimated light source 18 (e.g., laser).

Figure 2:
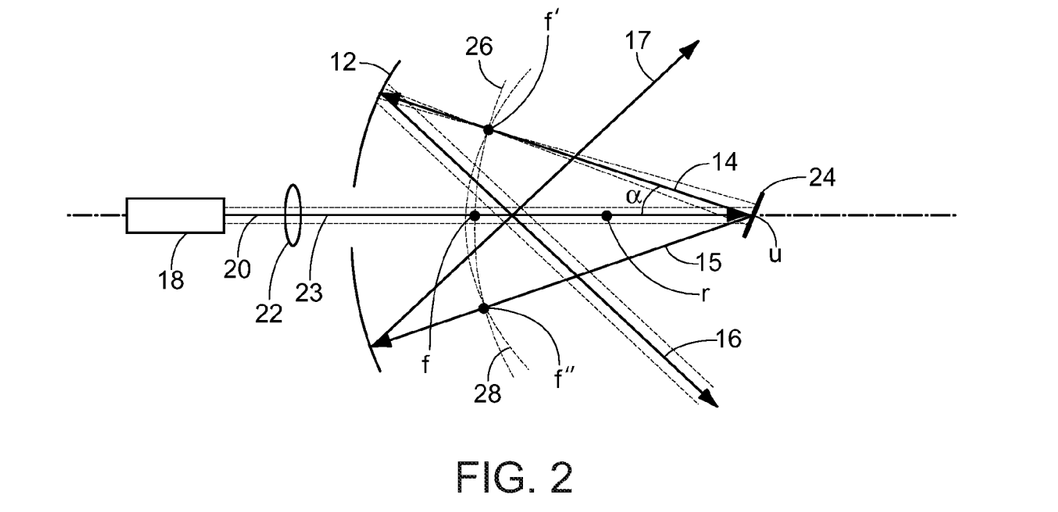
FIG. 2 is a schematic diagram of a beam steering apparatus having a parabolic reflector, according to one embodiment of the invention.

FIG. 2 a schematic diagram of a beam steering apparatus having a parabolic reflector, according to one embodiment of the invention. The beam steering apparatus includes the light source 18 that emits a beam 20, such as a laser beam. Using beam-forming optics, the beam 20 is directed, via an opening in the parabolic reflector 12, to a small-angle beam steering element 24 located at the point u. The beam-forming optics generally comprises at least one beam-focusing lens and/or beam-collimating lens, and other like lens (collectively, shown as focusing lens 22). In one embodiment, the steering element 24 comprises a planar mirror controlled by a piezo-electric controller (e.g., S-330 piezoelectric controller available from Physik Instrumente (PI) GmbH & Co. KG of Karlsruhe, Germany). In alternate embodiments, the steering element 24 may comprise an acousto-optical deflector, a micro-electromechanical systems (MEMS) deflector, an electro-optical deflector, and any like beam steering device. After passing through the lens 22, the beam 20 becomes a beam 23 directed, via an opening in the parabolic reflector 12, onto the steering element 24. The steering element 24 is positioned at the point u and is aligned to steer the beam 23 onto the surface 12. At one end of a steering range, the beam 23 is reflected, as the beam 14, to the surface 12 and, thereafter, as the beam 16. At the other end of the range, the beam 23 is reflected as the beam 15 to the parabolic reflector 12 and, thereafter, as the beam 17. In this embodiment, the lens 22 focuses the beam 23 (beams 14 and 15 thereof are shown) onto a surface 28. The surface 28 is disposed in front of the surface 12 and intersects, at a boundary of a steering range, with a surface 26 that passes through the focal point f and is disposed parallel to the parabolic reflector 12. Whereas the output beams 16 and 17 are well collimated, other output beams in a steering range of such beam steering apparatus may posses some residual divergence.

Figure 3:
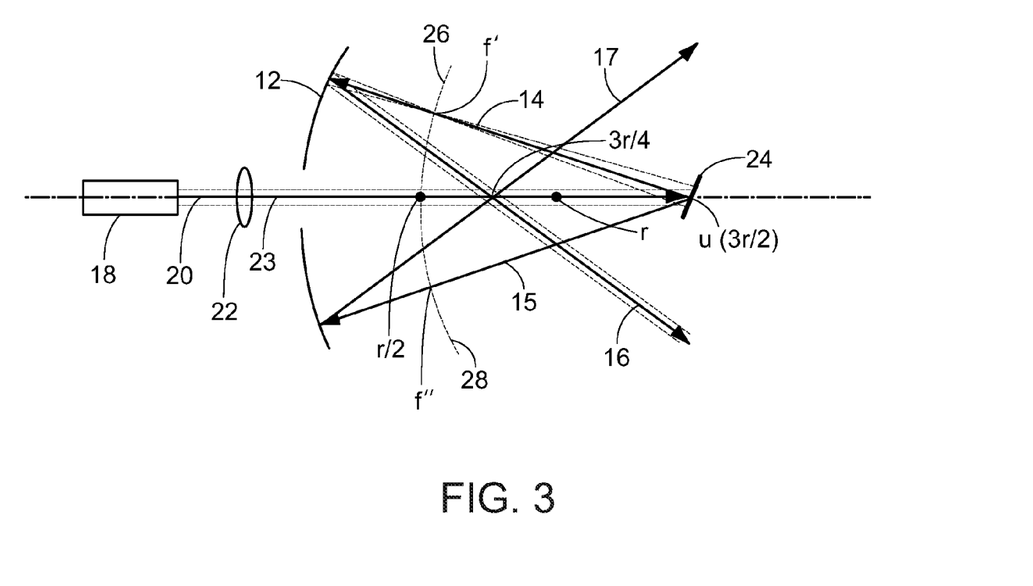
FIG. 3 is a schematic diagram of a beam steering apparatus having a parabolic reflector, according to another embodiment of the invention.

FIG. 3 is a schematic diagram of a beam steering apparatus having a parabolic reflector, according to another embodiment of the invention. The beam steering apparatus includes the lens 22 focusing the beam 23 onto the surface 28, which coincides with the surface 26 and is separated from the parabolic reflector 12 by a distance r/2, where r is a radius of curvature of the reflector 12. In this embodiment, the steering element 24 is positioned at a distance 3r/2 from the reflector 12, and beams originating by the light source 18 produce well collimated output beams (collimated beam 16 is shown) in an entire steering range of the beam steering apparatus.

Figure 3A:
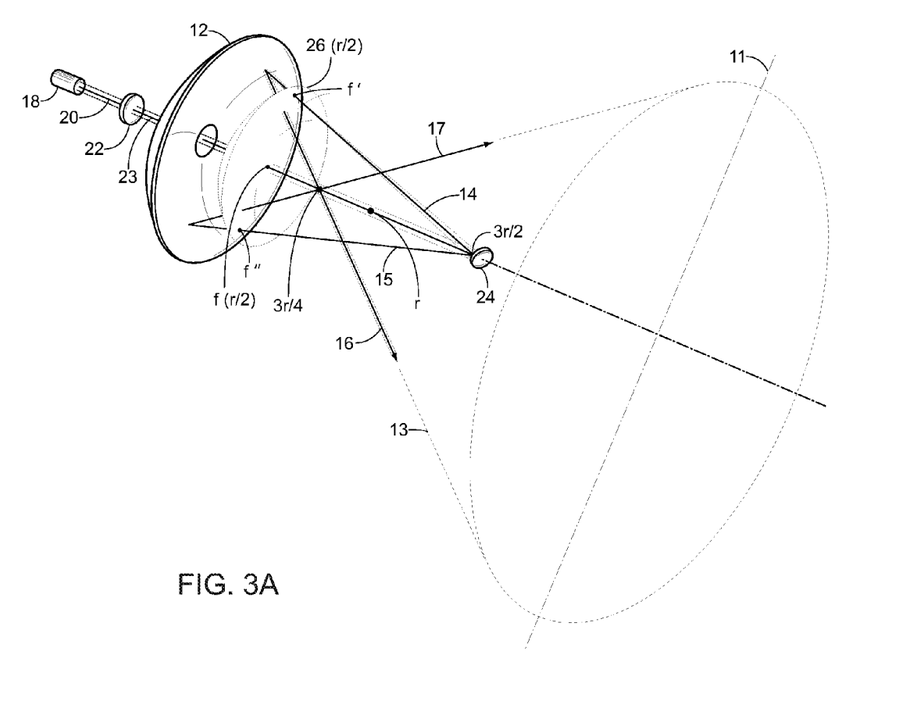
FIG. 3A is a schematic perspective view of the beam steering apparatus of FIG. 3.

FIG. 3A is a schematic perspective view of the beam steering apparatus of FIG. 3. In one exemplary embodiment, in an arbitrary plane 11, divergence of the output laser beams is ½ micro-radian or less within a steering range of about +/−6 degrees.

Figure 4:
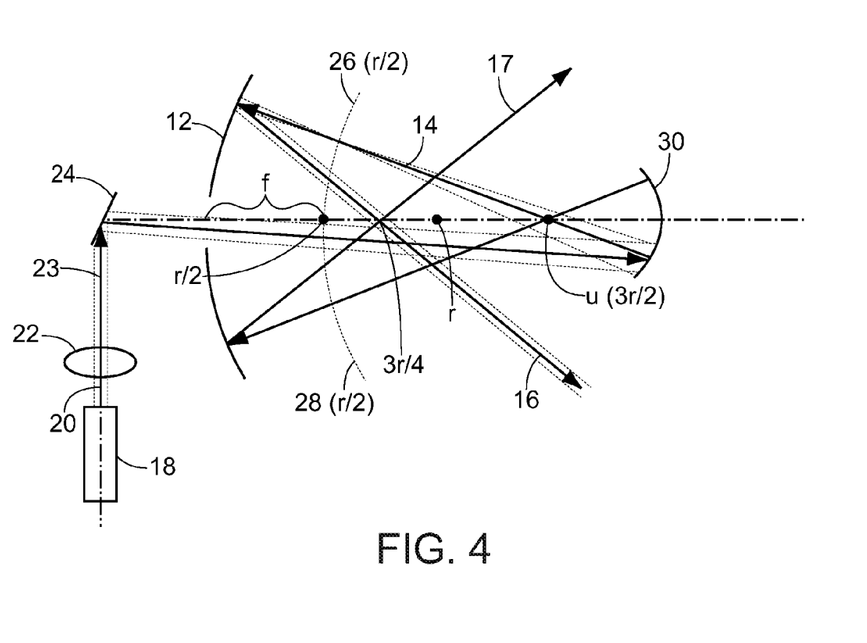
FIG. 4 is a schematic diagram of a beam steering apparatus having two parabolic reflectors, according to one embodiment of the invention.

FIG. 4 is a schematic diagram of a beam steering apparatus having two parabolic reflectors, according to one embodiment of the invention. In this embodiment, the lens 22 and a parabolic reflector 30 focus optical beams originated by the light source 18 onto the coinciding surfaces 26 and 28, which are parallel to the parabolic reflector 12 and are disposed at the focal length f from thereof. The beam steering apparatus also includes the steering element 24 and the parabolic reflector 12. After leaving the lens 22, the beam 23 is directed, by the steering element 24 through an opening in the parabolic reflector 12, to the parabolic reflector 30. Beams reflected from the parabolic reflector 30 pass through the point u disposed at a distance 3r/2 from the parabolic reflector 12 and are focused onto the surfaces 26/28 passing through the focal point f separated from the parabolic reflector 12 by a distance r/2, where r is a radius of curvature of the reflector 12. In operation, the parabolic reflector 30 amplifies a steering range that might be achieved by using only the parabolic reflector 12 (discussed in reference to FIGS. 3-3A).

Figure 5:
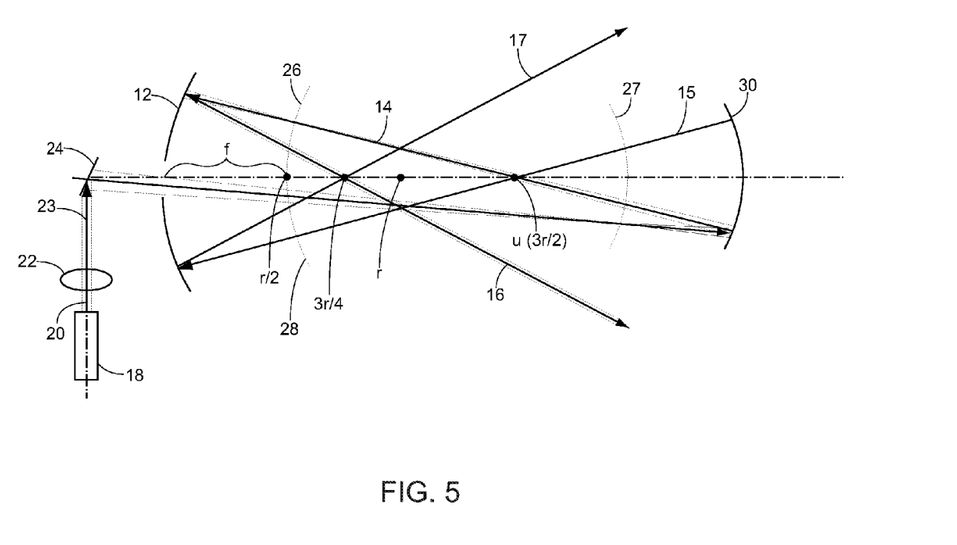
FIG. 5 is a schematic diagram of a beam steering apparatus having two parabolic reflectors, according to another embodiment of the invention.

FIG. 5 is a schematic diagram of a beam steering apparatus having two parabolic reflectors, according to another embodiment of the invention. In this embodiment, the lens 22 and parabolic reflector 30 focus optical beams originated by the light source 18 onto a surface 27, which is disposed in front of and parallel to the parabolic reflector 30. A distance between the surface 27 and the parabolic reflector 30 is selected such that a beam focused onto the surface 27 is then focused, by the parabolic reflector 30, onto the coinciding surfaces 26/28 (discussed above in reference to FIG. 4).

Figure 5A:
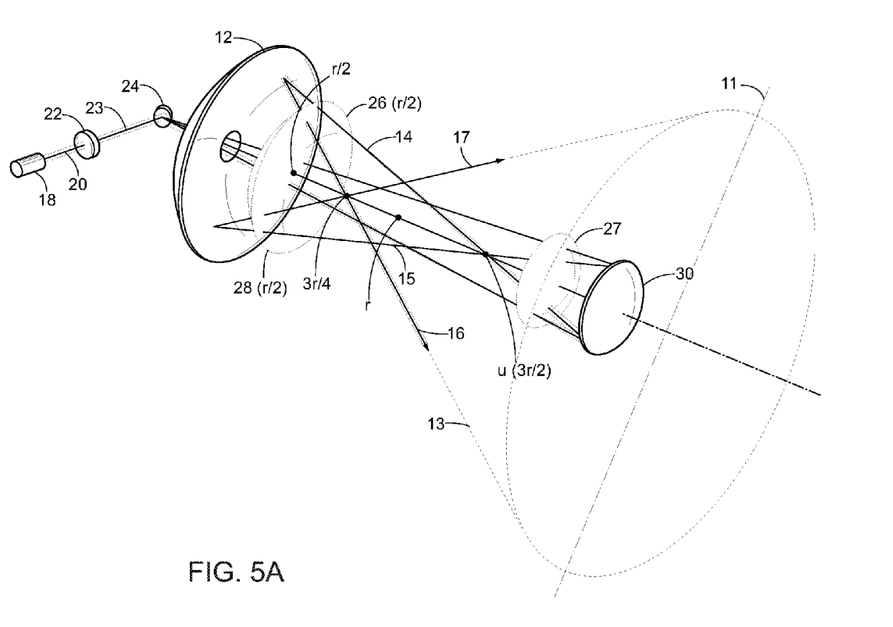
FIGS. 5A-5B are schematic perspective views of the beam steering apparatuses of FIGS. 4-5.
Figure 5B:
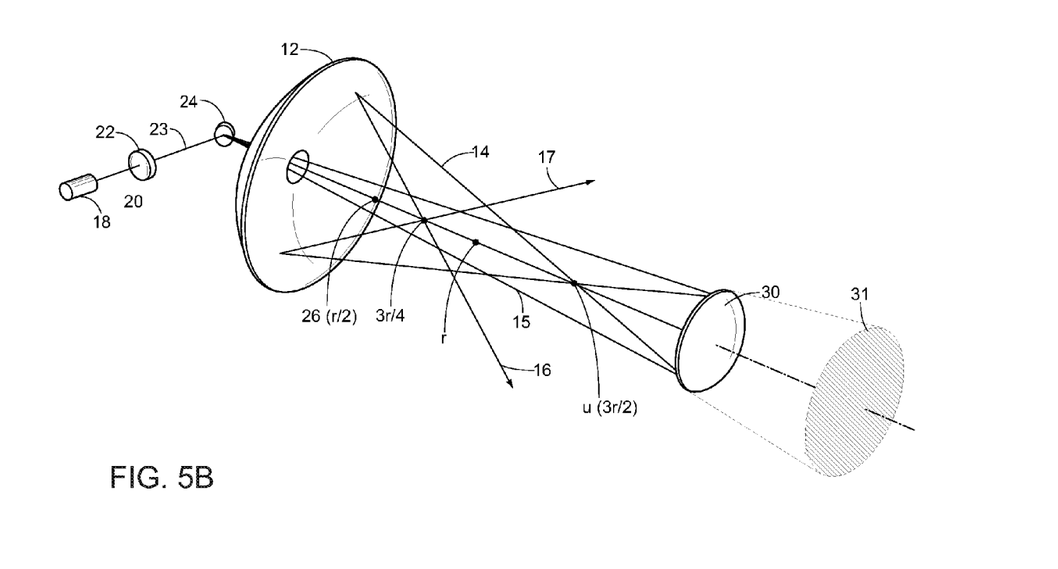

FIGS. 5A-5B are schematic perspective views of the beam steering apparatuses of FIGS. 4-5. In exemplary embodiments, values of factors of amplification of the parabolic reflectors 12 and 30 are about 2-4 and 10-30, respectively. In exemplary embodiments, an output steering range of such beam steering apparatuses may be about +/−30-45 degrees or greater. However, as shown in FIG. 5B, in some embodiments, the output steering range may partially be obstructed by the parabolic reflector 30 (obstructed field 31 is shown).

Figure 6:
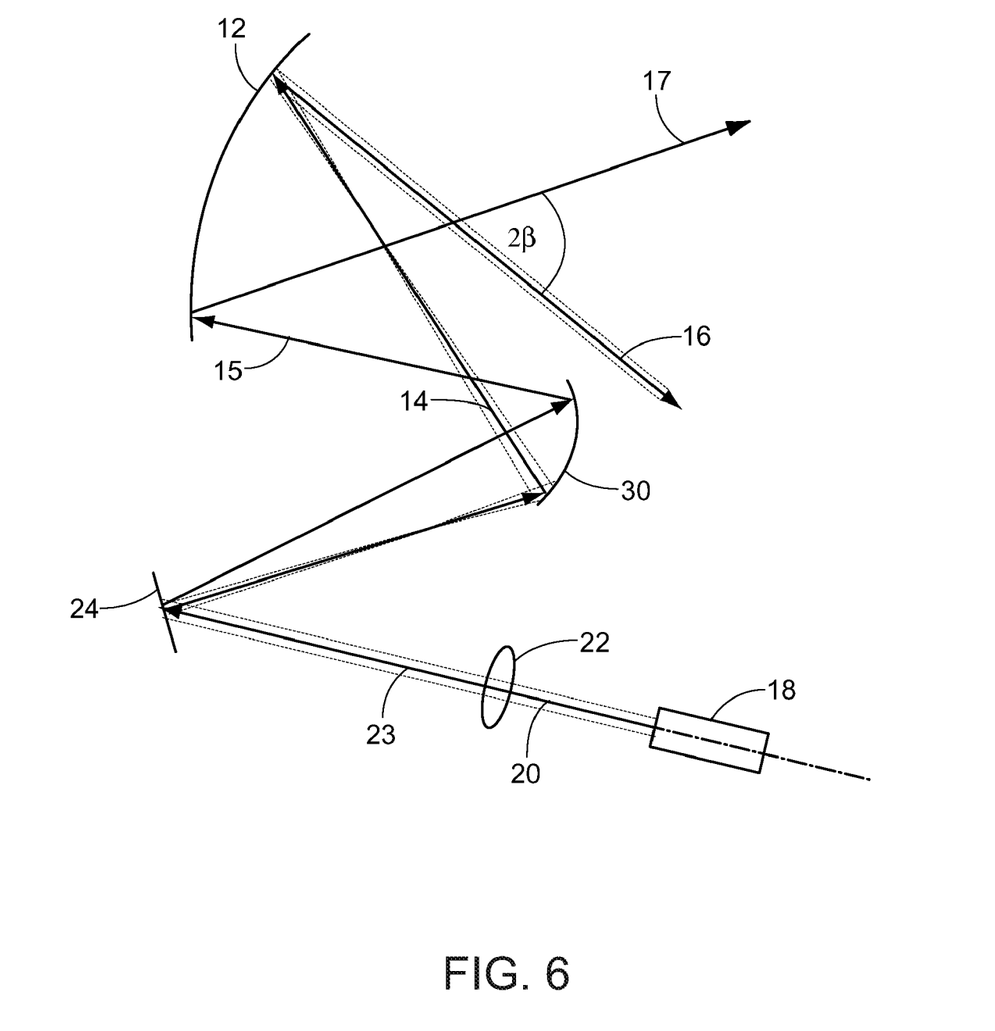
FIG. 6 is a schematic diagram of a beam steering apparatus having two off-axis parabolic reflectors, according to one embodiment of the invention.

FIG. 6 is a schematic diagram of a beam steering apparatus having two off-axis parabolic reflectors, according to one embodiment of the invention. In contrast with the steering apparatuses of FIGS. 4-5, optical axes of the parabolic reflectors 12 and 30 are disposed in the same plane, however, in an angular/spatial relationship providing elimination of obstruction of an output steering range of the apparatus by the parabolic reflector 30 thereof. In particular, optical axes of the parabolic reflectors 12 and 30 are disposed at pre-determined angles to one another and a to reflecting surface of the steering element 24, while a ray focusing scheme of the beam steering apparatus may correspond to one discussed in reference to FIG. 5 (as shown) or, alternatively, in reference to FIG. 4.

Figure 6A:
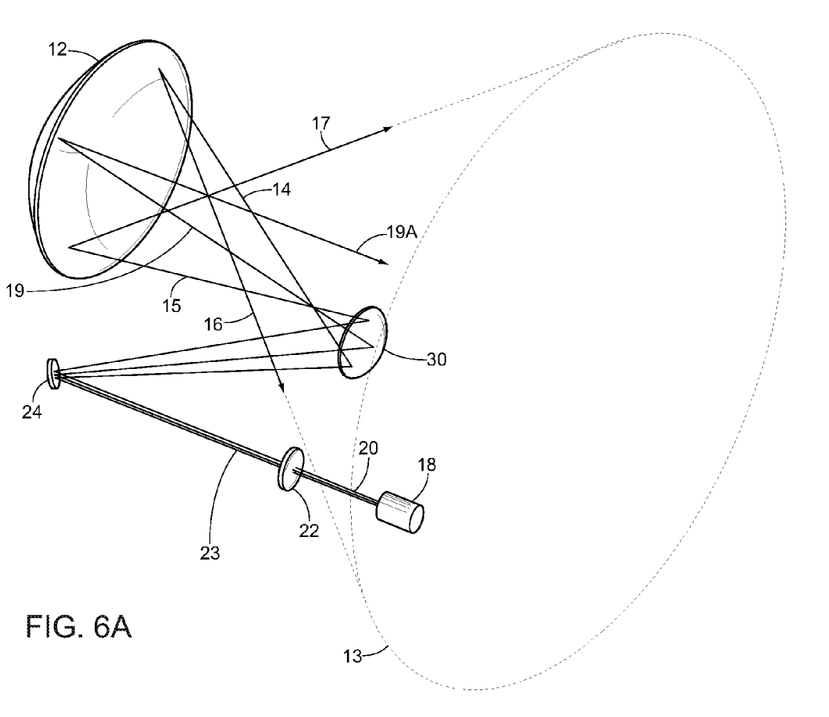
FIG. 6A-6B are schematic perspective views of the beam steering apparatus of FIG. 6.
Figure 6B:
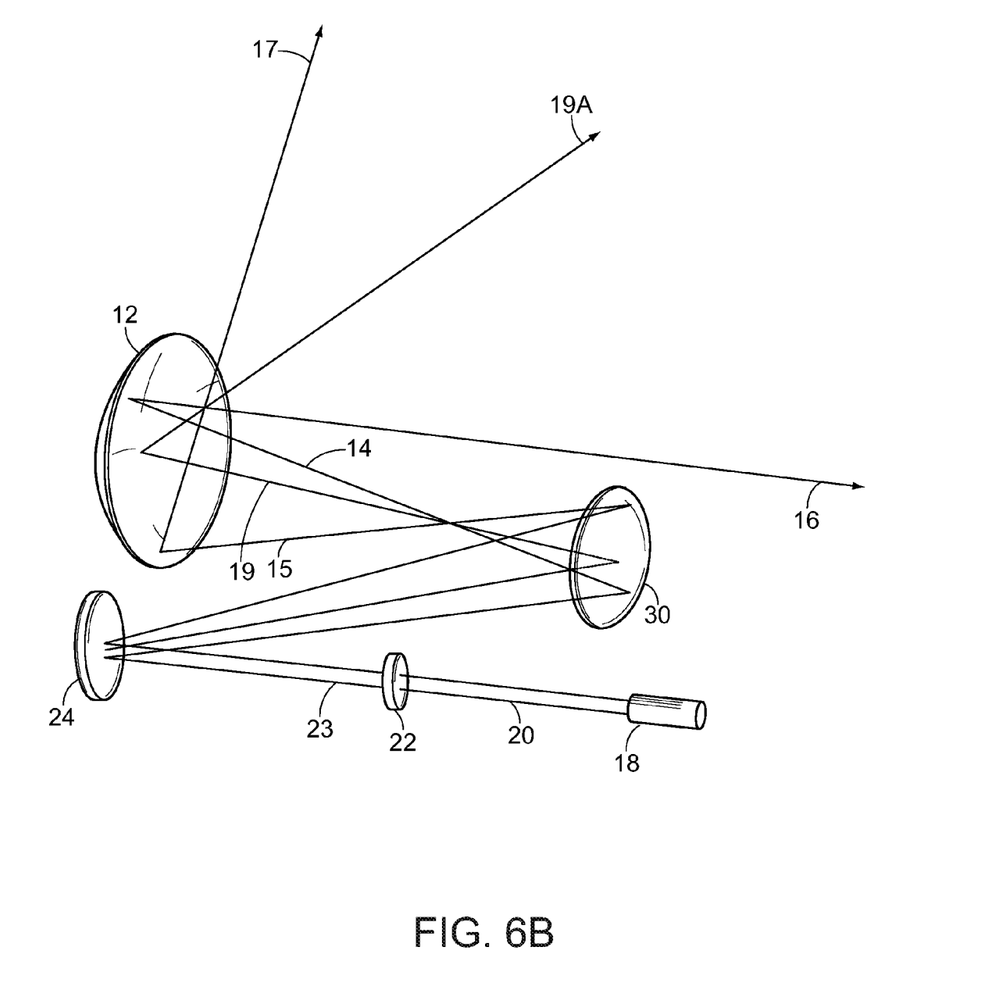

FIGS. 6A-6B are schematic perspective views of the beam steering apparatus of FIG. 6. An output steering range 13 of such an apparatus is free from obstruction caused by the parabolic reflector 30 and may be about +/−30-45 degrees or greater.

Figure 7:
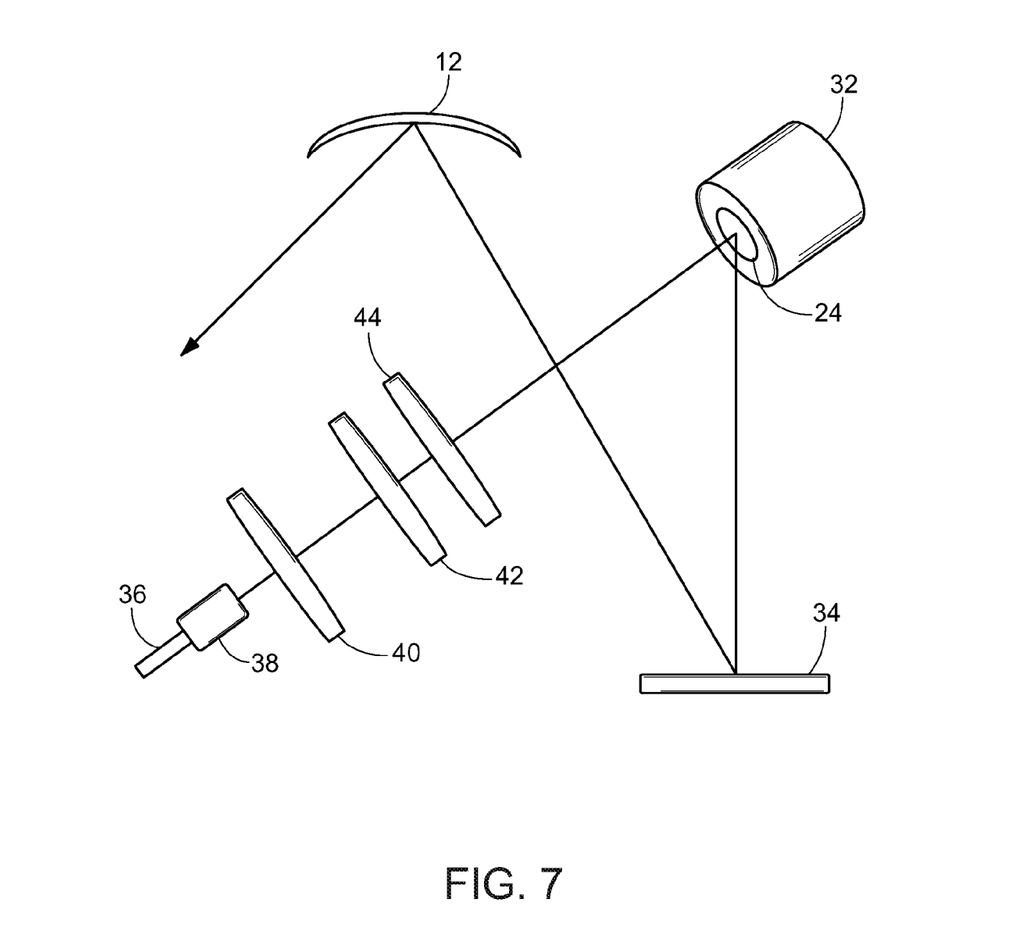
FIG. 7 is a schematic diagram of a beam steering apparatus having a flat mirror and a parabolic reflector, according to one embodiment of the invention.

FIG. 7 is a schematic diagram of a beam steering apparatus having a flat mirror and a parabolic reflector, according to one embodiment of the invention. The beam steering apparatus generally comprises the light source 18, a collimating lens 38, a beam-forming optics including a first beam expander lens 40, a second beam expander lens 42, and a focusing lens 44, an electrically controllable steering platform 32 having the steering element 24, a flat mirror 34, and the parabolic reflector 12. A laser beam 36 from the light source 18 (not shown) passes through the collimating lens 38 to the first beam expander lens 40. The lens 40 focuses the incident beam onto a focal point thereof (not shown) shared with the second beam expander lens 42, which directs the expanded and collimated laser beam towards the focusing lens 44. The focusing lens 44 directs the beam to the steering element 24. The steering element 24 reflects the beam onto the flat mirror 34, which is aligned for re-directing the beam towards the parabolic reflector 12. To minimize divergence of the output beams, the lens 44 focuses the beams onto a surface x (not shown), which is disposed in front of the parabolic reflector 12 at a pre-determined distance from thereof. In one exemplary embodiment, the collimating lens 38 has a focal length of 4.6 mm and is separated from the first beam expander lens 40 by a distance of 5 mm. The first beam expander lens 40 has a focal length of 25 mm and is separated from the second beam expander lens 42 by a distance of 67 mm. The second beam expander lens 42 has a focal length of 50 mm and is separated from the focusing lens 44 by a distance of 20 mm. The focusing lens 44 has a focal length of 120 mm and is separated from the steering element 24 by a distance of 110 mm. The piezo-electric steering element 24 has an angular steering range of +/−1.5 degrees and is separated from the flat mirror 34 by a distance of 135 mm. The flat mirror 34 is the separated by a distance of 70 mm from the parabolic reflector 12 having a focal length of 25 mm.

Figure 8:
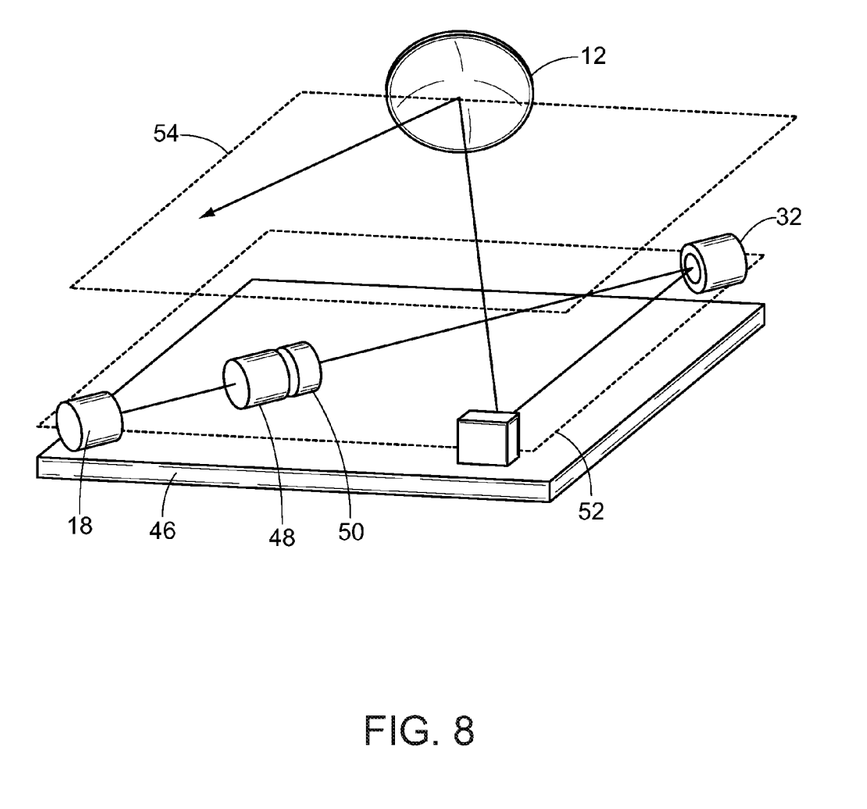
FIG. 8 is a schematic perspective view of the beam steering apparatus of FIG. 7.

FIG. 8 is a schematic perspective view of a beam steering apparatus of FIG. 7. In the depicted embodiment, a first beam collimator 48 includes the collimating lens 38 and the first beam expander lenses 40, and a second beam collimator 50 includes the second beam expander lens 42 and focusing lens 44. The light source 18, beam collimators 48 and 50, and steering platform 32 are mounted on a base support 46. Optical centers of theses components are disposed in a plane 52 that is parallel to a plane 54, in which lies an optical center of the parabolic reflector 12.

Figure 9:
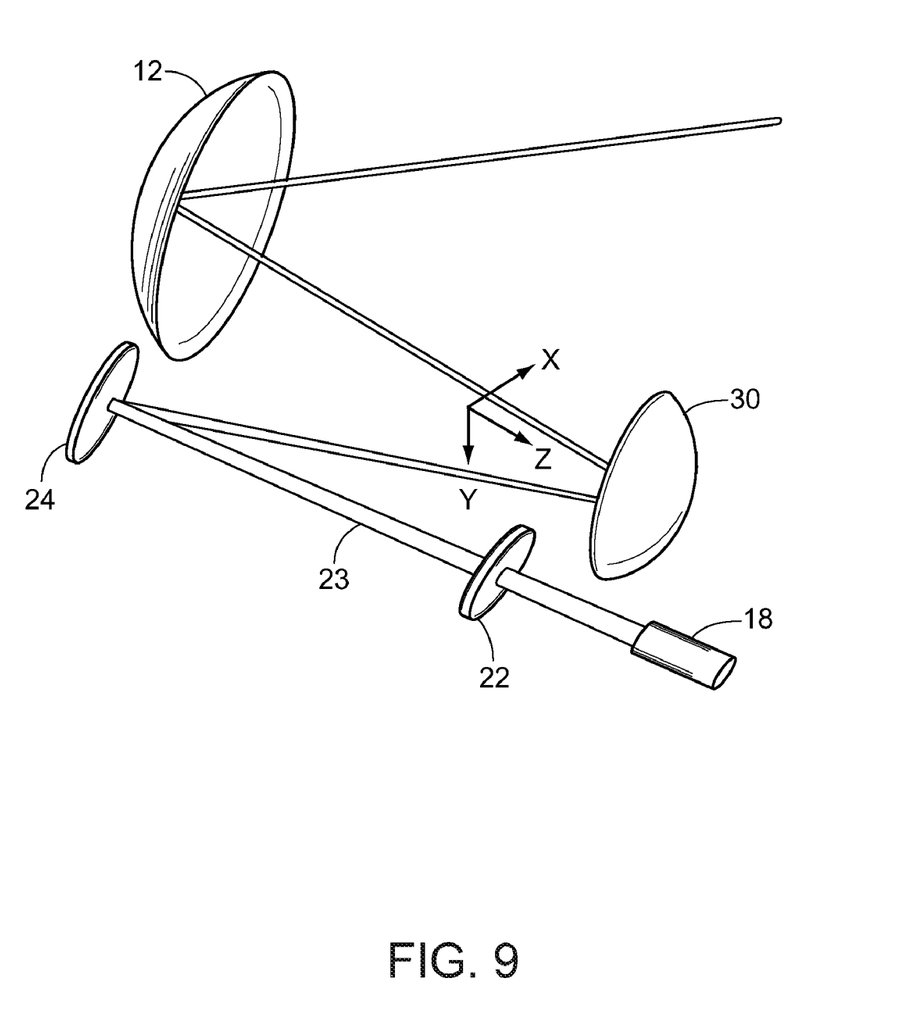
FIG. 9 is another schematic perspective view of the beam steering apparatus of FIG. 6.

FIG. 9 is another schematic perspective view of the beam steering apparatus of FIG. 6, wherein positions of components thereof are referenced to an exemplary set of Cartesian coordinates (x, y, z). In one exemplary embodiment, the light source 18 is situated at coordinates (0, 37, 42) mm, while the lens 22 having a focal length of 150 mm and a diameter of 25 mm is situated at coordinates (0, 28, 9) mm. The steering element 24 has a steering range of approximately +/−1.5 degrees and is situated at coordinates (0, 8, −60) mm, and a distance between the steering element 24 and lens 22 is about 72 mm. The parabolic reflector 30 has a focal length of 20 mm and is situated at coordinates (0, 0, 40), so that a distance between the parabolic reflector 30 and steering element 24 is about 100 mm. The parabolic reflector 12 has a focal length of 20 mm and is situated at coordinates (0, −33, −58) mm, and a distance between the parabolic reflectors 12 and 30 is about 103 mm. An output steering range of the beam steering apparatus is about +/−30-45 degrees, a frequency of beam scanning is about 1 KHz, and a pointing accuracy is about 1 micro-radian.

Figure 9A:
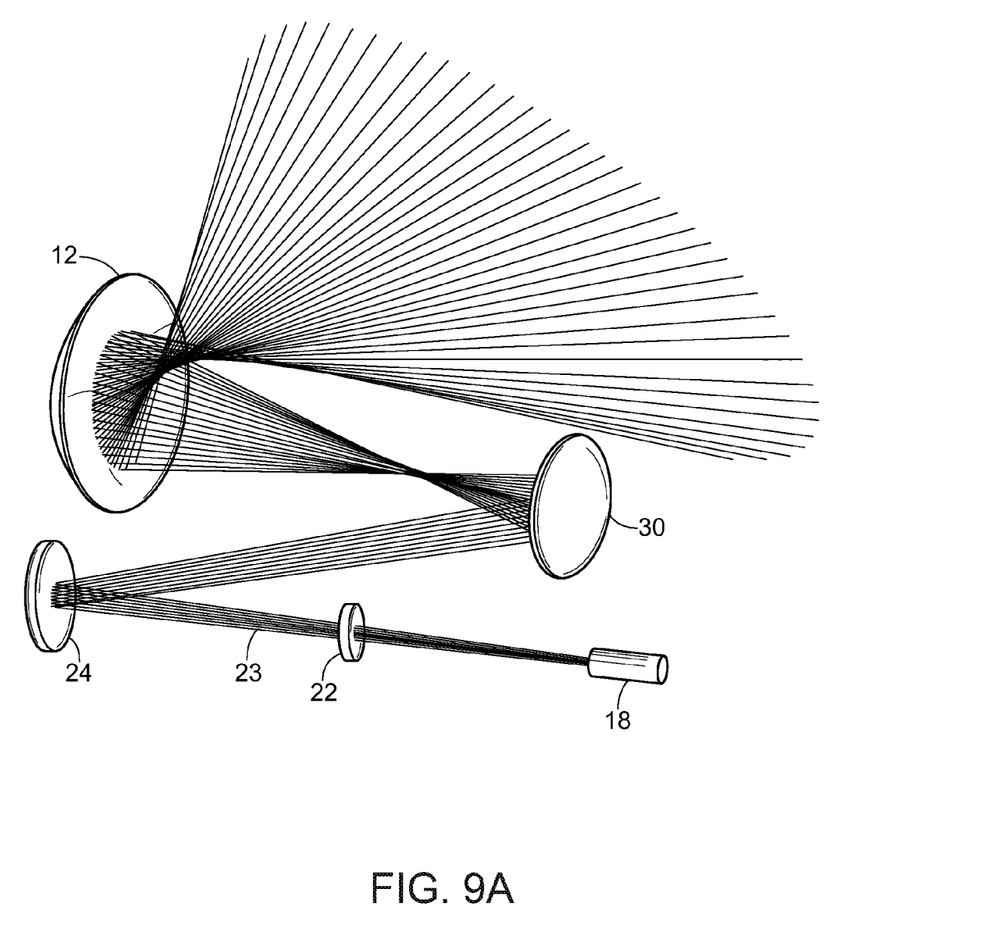
FIG. 9A is still another schematic perspective view of the beam steering apparatus of FIG. 6.

FIG. 9A is still another schematic perspective view of the beam steering apparatus of FIG. 6, wherein a plurality of beams originated from the light source 18 is depicted to illustrate a three-dimensional pattern of ray paths formed in a steering range of the apparatus.

Figure 10:
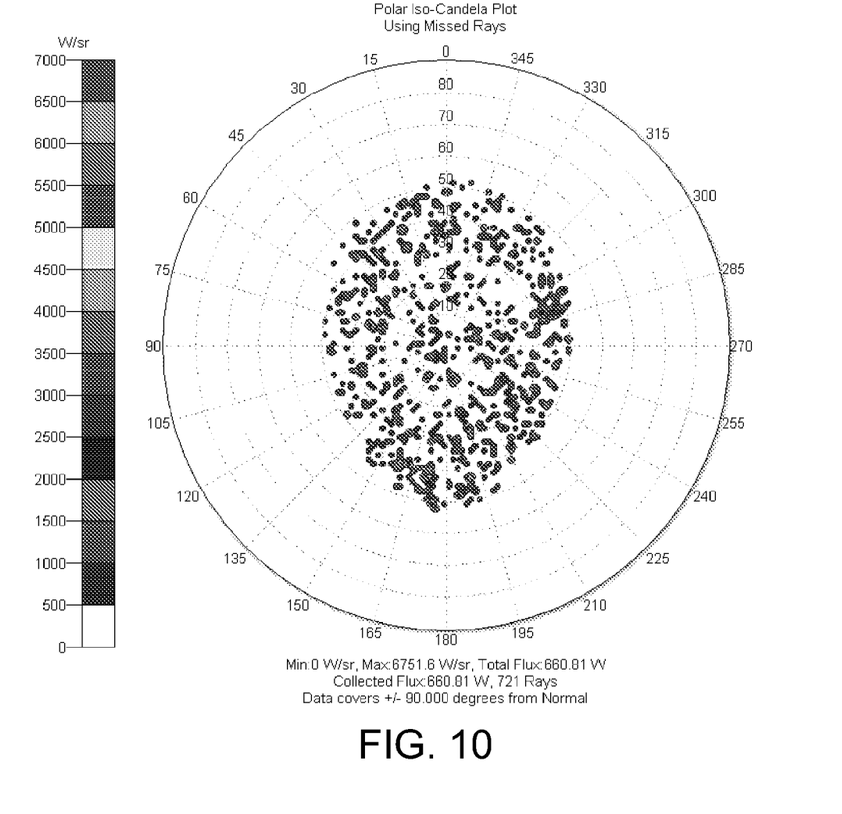
FIG. 10 is an exemplary polar iso-candela plot of output beams in the apparatus of FIG. 6.

FIG. 10 is an exemplary polar iso-candela plot of output beams in the apparatus of FIG. 6. The plot depicts, in polar coordinates, a constant-power profile of a large number of output beams for the embodiment discussed in reference to FIG. 9. The plot shows that an angular range of the output beam has a profile of a slightly flattened cone, which subtends about +/−45 degrees and +/−50 degrees along orthogonal axes. The plot indicates that there are no "blind" spots (i.e., no obstructions) in the steering range, and that the output beams are substantially uniform.

One of ordinary skill in the art will realize that other optical arrangements for beam-forming and/or beam-focusing optics may be used in place of or in addition to the described configurations without departing from the concepts of the invention. Particular optical designs may be completed using, for example, the TracePro™ program available from Lambda Research, Inc. of Littleton, Mass., and the like software products.

Although the invention herein has been described with reference to particular illustrative embodiments thereof, it is to be understood that these embodiments are merely illustrative of the principles and applications of the present invention. Therefore numerous modifications may be made to the illustrative embodiments and other arrangements may be devised without departing from the spirit and scope of the present invention, which is defined by the appended claims.

What is claimed is:

1. An apparatus for steering an optical beam, the apparatus comprising:
    a reflector provided with a concave reflecting surface (CRS) an optical axis, said reflector defining an opening therein at the intersection of said CRS and said optical axis;
    a beam steering element having a flat reflective surface, the center of said beam steering element being aligned with said optical axis of said reflector; and
    beam-forming optics for collimating and focusing an optical beam through said opening in said reflector to said beam steering element,
    wherein said beam steering element is aligned for reflecting said optical beam onto said CRS.

2. The apparatus of claim 1, wherein said CRS is a parabolic reflecting surface.

3. The apparatus of claim 1, wherein said CRS is a spherical reflecting surface, an aspherical reflecting surface, a cylindrical reflecting surface, an ellipsoidal reflecting surface, or a hyperboloidal reflecting surface.

4. The apparatus of claim 1, wherein said beam-forming optics focuses the first beam onto a first surface disposed in front of said CRS and intersecting with a second surface at a boundary of a beam steering range of the apparatus, said second surface (i) parallel to said CRS and (ii) passing through a focal point of said CRS.

5. The apparatus of claim 4, wherein said first and second surfaces are located at a distance r/2 from said reflector and further wherein said beam steering element is located at a distance of 3r/2 from said reflector, wherein r is the radius of curvature of said reflector.

6. The apparatus of claim 1, wherein the beam-forming optics focuses said optical beam onto a first surface disposed in front of said CRS and coinciding with a second surface, said second surface (i) parallel to said CRS and (ii) passing through a focal point of said CRS.

7. The apparatus of claim 1, wherein said optical axis coincides with an optical axis of said beam-forming optics.

8. The apparatus of claim 1, wherein said beam steering element is electronically controlled.

9. The apparatus of claim 8, wherein said beam steering element is a piezo-electric beam steering element.

10. The apparatus of claim 1, wherein the optical beam is a laser beam.

11. The apparatus of claim 1, wherein said beam-forming optics comprises at least one beam-focusing lens and/or beam-collimating lens.

12. A method for steering an optical beam, the method comprising:
    directing a collimated and focused optical beam onto a beam steering element having a flat reflective surface, the center of said beam steering element being aligned with the optical axis of a concave reflecting surface (CRS);
    directing said optical beam reflected from said beam steering element onto said CRS forming an output beam; and
    rotating said beam steering element to steer the output beam.

13. The method of claim 12, wherein said CRS is a parabolic reflecting surface.

14. The method of claim 12, wherein said CRS is a spherical reflecting surface, an aspherical reflecting surface, a cylindrical reflecting surface, an ellipsoidal reflecting surface, or a hyperboloidal reflecting surface.

15. The method of claim 12, further comprising the step of: directing said optical beam onto the beam steering element through an opening defined in said CRS.

16. The method of claim 12, further comprising the step of: focusing said optical beam onto a first surface disposed in front of said CRS and intersecting with a second surface at a boundary of a beam steering range of the apparatus, said second surface (i) parallel to said CRS and (ii) passing through a focal point of said CRS.

17. The method of claim 16 wherein said first and second surfaces are located at a distance r/2 from said CRS and further wherein said beam steering element is located at a distance of 3r/2 from said CRS, wherein r is the radius of curvature of said CRS.

18. The method of claim 12, further comprising the step of: focusing said optical beam onto a first surface disposed in front of said CRS and coinciding with a second surface, said second surface (i) parallel to said CRS and (ii) passing through a focal point of said CRS.

* * * * *